United States Patent
Huang et al.

(10) Patent No.: US 9,185,754 B2
(45) Date of Patent: Nov. 10, 2015

(54) INTERCONNECTABLE LED MODULE FOR USE IN A DIRECT CURRENT CIRCUIT

(71) Applicants: Michelle Kun Huang, San Antonio, TX (US); Steven A. Moya, San Antonio, TX (US)

(72) Inventors: Michelle Kun Huang, San Antonio, TX (US); Steven A. Moya, San Antonio, TX (US)

(73) Assignee: General LED, Inc., San Antonio, TX (US)

( * ) Notice: Subject to any disclaimer, the term of this patent is extended or adjusted under 35 U.S.C. 154(b) by 0 days.

(21) Appl. No.: 14/225,737

(22) Filed: Mar. 26, 2014

(65) Prior Publication Data

US 2014/0292214 A1  Oct. 2, 2014

Related U.S. Application Data

(60) Provisional application No. 61/805,327, filed on Mar. 26, 2013.

(51) Int. Cl.
*H05B 37/00*   (2006.01)
*H05B 33/08*   (2006.01)
*F21S 4/00*    (2006.01)
*F21V 23/06*   (2006.01)

(52) U.S. Cl.
CPC ............. *H05B 33/0806* (2013.01); *F21S 4/001* (2013.01); *F21S 4/008* (2013.01); *F21V 23/06* (2013.01); *H05B 33/0878* (2013.01)

(58) Field of Classification Search
USPC ............... 362/249.01, 249.02, 145, 227, 234; 315/185 R, 193
See application file for complete search history.

(56) References Cited

U.S. PATENT DOCUMENTS

2009/0303711 A1*  12/2009  Remus et al. ................. 362/234
2012/0182739 A1*   7/2012  Leung et al. ............. 362/249.06

* cited by examiner

*Primary Examiner* — David H Vu
(74) *Attorney, Agent, or Firm* — Alan R. Thiele; Rosenthal Pauerstein; Sandoloski Agather LLP

(57) ABSTRACT

A system and method for interconnecting LED modules that receive electrical energy from a direct current electrical energy power supply includes a first type of mating connector to provide an input of direct current electrical energy to a printed circuit board contained within an interconnectable LED module and a second type of mating connector to provide an output of direct current electrical energy to and interconnecting with another interconnectable LED module. The second type of mating connector attaches to the first type of mating connector in the next LED module in a string of interconnectable LED modules.

14 Claims, 4 Drawing Sheets

INTERCONNECTABLE LED MODULE FOR USE IN A DIRECT CURRENT CIRCUIT

CROSS REFERENCE TO RELATED APPLICATION

This application claims the benefit of Provisional U.S. Patent Application 61/805,327 filed on Mar. 26, 2013.

STATEMENT REGARDING FEDERALLY FUNDED RESEARCH AND DEVELOPMENT

The invention described in this U.S. Patent Application was not the subject of federally sponsored research or development.

FIELD

The present invention relates to LED modules used in direct current circuits and the connections therebeween.

BACKGROUND

In recent years the improvements in the output of light emitting diodes (LEDs) have resulted in LEDs taking the place of incandescent, fluorescent and halogen lighting sources. For lighting applications, particularly illuminated signage, printed circuit board mounted LEDs are enclosed with an LED module. Such LED modules are connected one to another in long strings. These strings of LED modules are then mounted within a sign. It is the job of the sign maker to select the number of LED modules needed, then assemble and mount the strings of LED modules within the signs. This creation of LED strings by the sign maker for a particular application is a labor intensive process as the wires between the LED modules must be first cut, then stripped of their insulation to expose bare wire. The bare wires between adjacent LED modules are then twisted together. Once twisted together, the connection is typically secured with a wire nut applied over and covering the connection made by twisting the bare wires together. If the maker or one tasked with repairing a string of LED modules is required to perform the assembly or repair of a string of LED modules while standing on a ladder or positioned far off the ground, this assembly or repair of a string of LED modules can be hazardous. Accordingly, there is a need in the art for a system which eliminates the need to cut wires, strip insulation to expose bare wires, twist bare wires together and secure the connection of twisted bare wires together with a wire nut.

SUMMARY

A system and method for using interconnectable LED modules, connected one to another in a direct current system, for enabling illumination from a string of interconnectable LED modules disclosed. The system includes a direct current electrical energy power supply and one or more interconnectable LED modules. The method includes mating a first type of mating connector with a second type of mating connector associated with each LED module or sets of LED modules thereby eliminating the need to break strings of LED modules and then reconnect them by twisting wires together and securing the connection with a wire nut.

Each interconnectable LED module includes a printed circuit board. Such LED modules are well know in the prior art. The printed circuit board provides mechanical support for at least one LED and an electrically conductive path to supply direct current electrical energy to the LED mounted on the printed circuit board. At least one wire is attached to the LED to receive or input direct current electrical energy. Another wire is attached to the LED to send or output direct current electrical energy to another printed circuit including at least one LED.

At the end of the at least one wire conducting direct current electrical energy to the printed circuit board is attached a first type of mating connector. At the end of the wire conducting the direct current electrical energy to another printed circuit board is attached a second type of mating connector. Thus, a system for providing illumination for a set of LEDs begins with a direct current electrical energy power supply. The direct current electrical energy power supply is connected to the first type of mating connector which provides direct current electrical energy to the printed circuit board. At the end of the wire extending away from the printed circuit board to another printed circuit board is a second type of mating connector. This second type of mating connector is connected to the first type of mating connector on the next printed circuit board and so on to create a string of interconnectable LED modules.

BRIEF DESCRIPTION OF THE DRAWING FIGURES

A better understanding to the interconnectable LED module for use in a direct current circuit may be had by reference to the drawing figures wherein.

DESCRIPTION OF THE EMBODIMENTS

LEDs are current driven electrical devices. This means that the light output from an LED and the forward voltage across the LED are determined by the electrical current applied to the LED. Both alternating current (AC) electrical energy and direct current (DC) electrical energy can be used to cause LEDs to emit light. However, when an alternating current (AC) electrical energy source is used, which energy source has a frequency of 50 Hz to 102 Hz, the light emitted from an LED will be perceived to by the human eye as flickering. To eliminate such undesirable flickering, a direct current (DC) supply of electrical energy is often applied to the LED instead of alternating current (AC). Specifically, a constant amount of direct current electrical energy applied to an LED causes the LED to emit a stable, non-flickering output of visible light.

Figure 1:
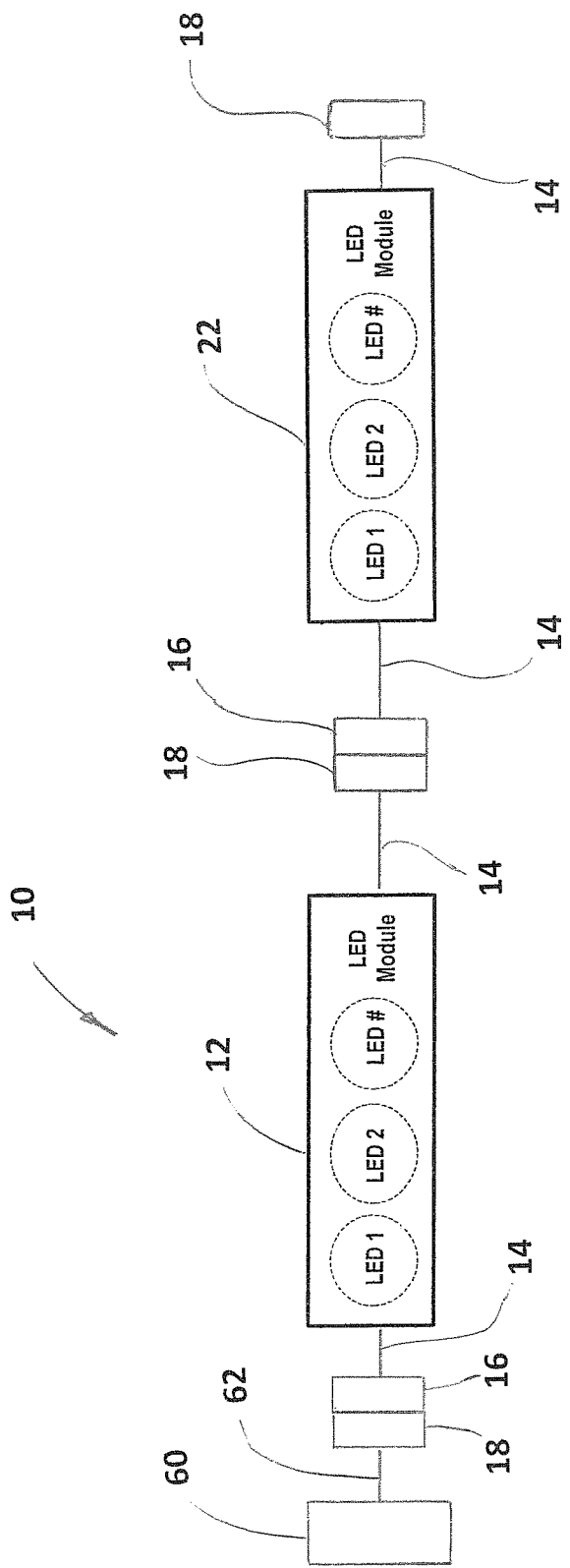
FIG. 1 is a schematic drawing of a string of LED modules connected to a direct current electrical energy power supply according to the present invention.

Shown in FIG. 1 is a schematic of a string 10 of interconnectable LED modules 12, 22 according to the present invention, connected one to another. The first interconnectable LED module is attached to a direct current electrical energy power supply 60.

As is well known to those of ordinary skill in the art, the central portion of an LED module is a printed circuit board.

The printed circuit board mechanically supports one or more LEDs and positions the LEDs within the LED module. In addition, the printed circuit board includes electrically conductive pathways connected to the one or more LEDs. In a direct current system, one or more wires 14 are electrically connected to the electrically conductive pathways on the printed circuit board. In a string of LEDs, one or more wires 14 connect the electrically conductive pathways on each printed circuit board in each LED module one to another.

Typically an LED module 12 includes a plastic housing with surrounds and protects the printed circuit board. If desired a plastic lens is included with or made a part of plastic housing to manage the light rays emitted by the LED. Accordingly, each plastic lens is positioned over an LED.

The plastic housing which encloses the printed circuit board typically includes openings formed somewhere on the edge of the housing. These openings allow the one or more wires 14 conducting electrical energy to the LED on the printed circuit board and the one or more wires 14 connecting the LED modules to pass into and out of the plastic housing.

Figure 2A:
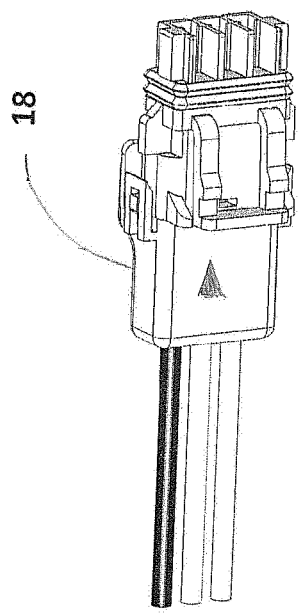
FIG. 2A is a perspective view of first type of mating connector.
Figure 2B:
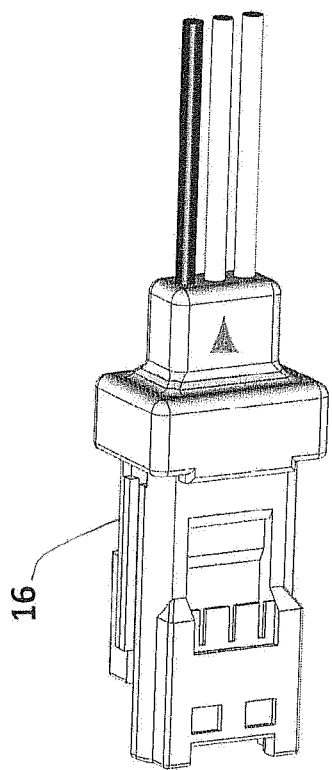
FIG. 2B is a perspective view of second type of mating connector.
Figure 3:
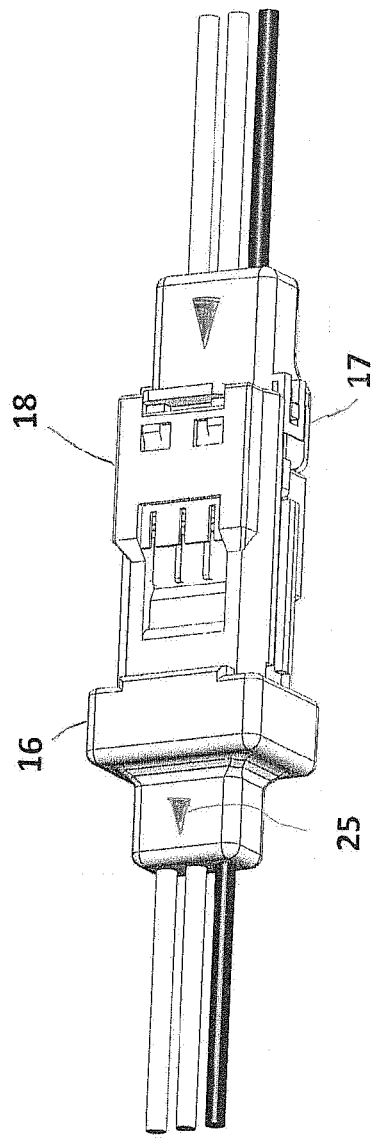
FIG. 3 is a perspective view of first type of mating connector mated to a second type of mating connector.

As shown in FIG. 1 on the side of the first LED module 12 in the string of LED modules 10 closest to the direct current electrical energy power supply 60 is a first type of mating connector 16. Shown in FIG. 2A is a perspective view of the first type of mating connector 16. On the other side of the first LED module is a second type of mating connector 18. Shown in FIG. 2B is a perspective view of the second type of mating connector 18. Shown in FIG. 3 is a perspective view of the first and second types of mating electrical connectors connected one to another in a snap fit connection 17.

Referring back to FIG. 2A, the first type of electrical connector 16 is a female type of electrical connector and the second type of electrical connector 18 is a male type of electrical connector as shown in FIG. 2B. While a male and female connectors are shown as the first and second type of mating electrical connectors respectively in the preferred embodiment, those of ordinary skill in the art will understand that the use of female and male mating electrical connectors as the first and second type of mating electrical connectors will not affect the electrical operation of the string of LED modules. As seen in FIG. 2A and in FIG. 2B the design of the housing of the first and second type of mating connectors enables a snap fit connection 17 between the first and second type of mating connectors. In addition, the outside portion of the male and female connectors may include protrusions for frictionally holding the interconnected male and female connectors in place if the string of LED modules is placed within a channel such as a channel used to form a letter in an illuminated sign.

Returning to FIG. 1, the first LED module 12 that is connected to the direct current electrical energy power supply 60 is connected to a second LED module 22 by the interconnection of the second type of mating connector 18 on the output side of the first LED module 12 to a first type of mating connector 16 on the input side of the second LED module 22. Repeating such type of connection between LED modules will enable the formation of a string of LED modules 10 by repeating the connection between the first and second LED modules until the string of LED modules is completed. As shown in FIG. 2A, FIG. 2B and FIG. 3, the first and second type of mating connectors may include a visible arrow 25 which indicates the flow of direct current electrical energy thereby simplifying the assembly of a string of interconnectable LED modules.

In some applications sets of LED modules may be connected to individual LED modules or to another set of LED modules. A set of LED modules includes two or more LED modules which are not connected by mating connectors. Rather the LED modules are interconnected by wires which do not include mating connectors. The interconnected first and second types of mating connectors are then used to build the string of LED modules.

As shown in FIG. 1, the first LED module 12 is connected to the direct current electrical energy power supply 60 using a second type mating connector on the direct current electrical energy power supply 60 and a first type 16 of mating connectors on the first LED module 12. The wires 62 leading from the direct current electrical energy power supply 60 end at the second type 18 of mating connector. This second type of mating connector 18 joins to the first type of mating connector 16 on the input side of the first LED module 12.

Figure 4:
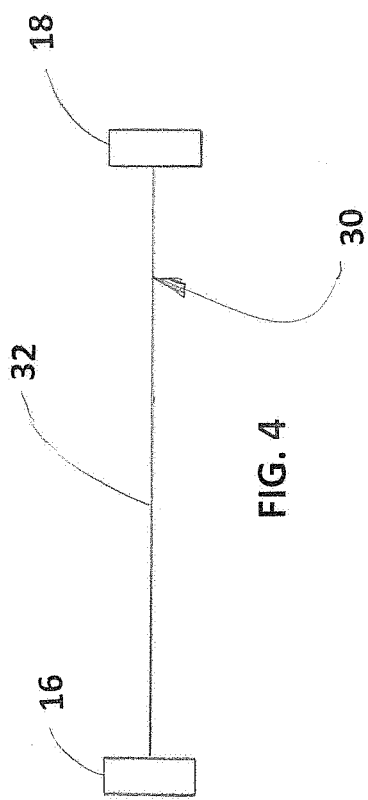
FIG. 4 is a schematic drawing of an extension connector assembly.

Shown in FIG. 4 is an extension connection assembly 30. If it is desired to space LED modules farther apart than the wires attached thereto will allow, an extension connection assembly 30 may be used. The extension assembly 30 is a plain wire 32 with a first type of mating connector 16 on one end and a second type of mating connector 18 on the other end. The extension connection assembly 30 is used by mating the first type of mating connection on one end of extension connection with a second type of mating connection. The second type of mating connection at the other end of the plain wire may then be mated with a first type of mating connection on an LED module.

Figure 5:
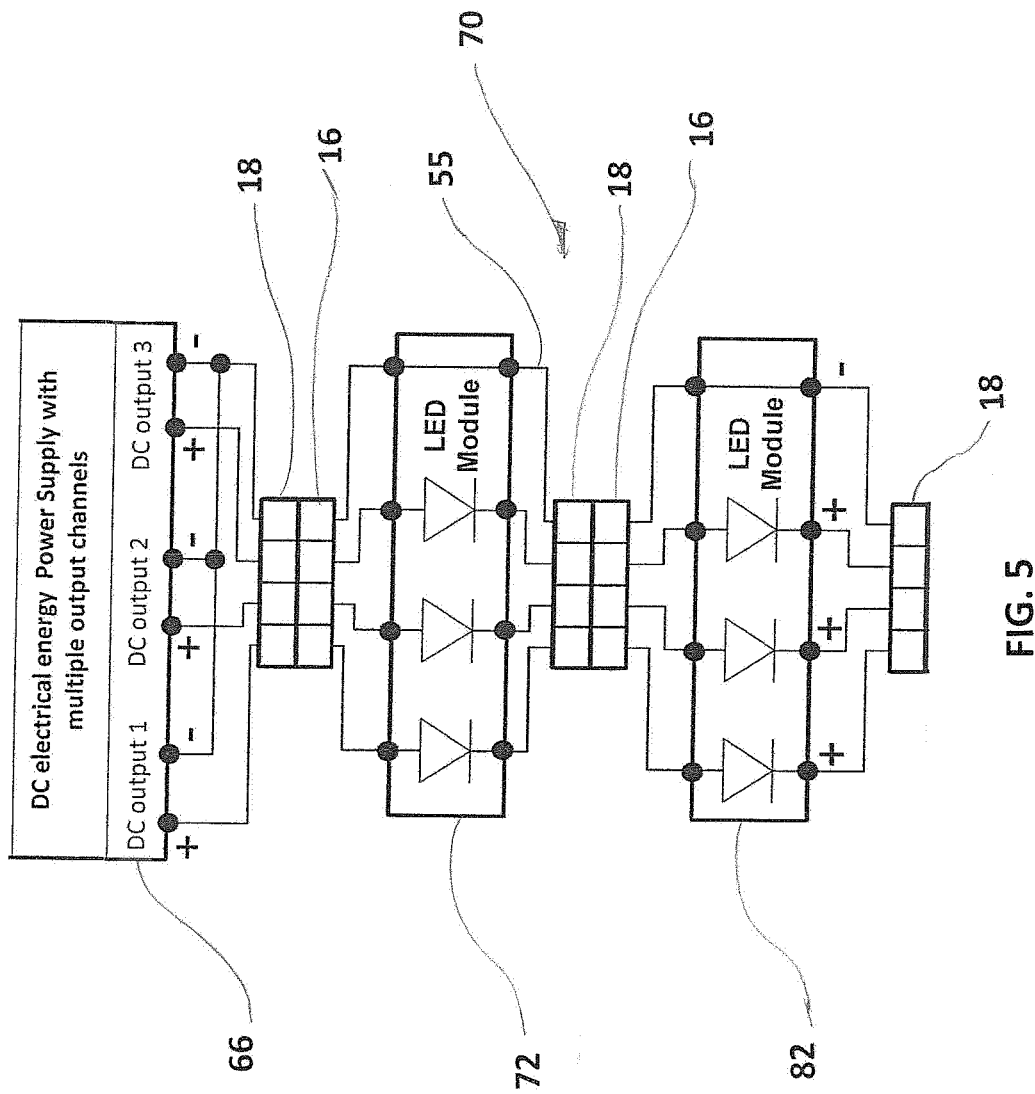
FIG. 5 is a schematic drawing of another embodiment of a string of LED modules connected to a direct current energy power supply.

Shown in FIG. 5 is the system of present invention used with a string of interconnectable LED modules 72, 82 wherein individual LEDs are in a series connections with individual LEDs further down the string of interconnectable LED modules rather than individual LEDs within an LED module as shown in FIG. 1. Herein the first LED module 72 is connected to multiple sources 66 of direct current electrical energy, but on the end of the string of LED modules 70 the outputs from the last LED module are connected by a single wire 55 to a common polarity to close the electrical circuit. The interconnections of the present invention may be used to connect one LED module to another by mating the first type of mating connector 16 with the second type of mating electrical connector 18. In addition the common polarity connection 55 may also run through the first and second type of mating connections described above.

While the present invention has been described in terms of its preferred embodiment, those of ordinary skill in the art will understand that still other embodiments have been enabled by the foregoing disclosure. Such other embodiments shall be included with the scope and meaning of the appended claims.

What is claimed is:

1. An interconnectable LED module for use with a direct current electrical energy power supply and another interconnectable LED module, said interconnectable module comprising:

a printed circuit board providing mechanical support and direct current electrical energy to an LED;

at least one wire for connecting the direct current electrical energy power supply to said printed circuit board and for interconnecting the interconnectable LED module to another interconnectable LED module;

a first type of mating connector for inputting direct current electrical energy connected to said at least one wire connected to said printed circuit board;

a second type of mating connector connected to said at least one wire for outputting direct current electrical energy from said printed circuit board and for interconnecting the interconnectable LED module to another interconnectable LED module;

whereby the interconnectable LED modules are connected one to another by mating said first type of mating connector with said second type of mating connector.

2. The interconnectable LED module as defined in claim 1 wherein said first type of mating connector is a female connector and said second type of mating connector is a male connector.

3. The interconnectable LED module as defined in claim 2 wherein said first type of mating connector and said second type of mating connector snap fit together.

4. The interconnectable LED module as defined in claim 1 where said first type of mating connector and said second type of mating connector include visible arrows indicating the input of direct current electrical energy through said first type of mating connector and the output of direct current electrical energy through said second type of mating connector.

5. A string of interconnectable LED modules for use with a direct current electrical energy supply, said string of interconnectable LED modules comprising:
　a set of LED modules including a first LED module and at least one second LED module;
　said first LED module and said at least one second LED module including a printed circuit board providing mechanical support and direct current electrical energy to an LED;
　at least one wire for inputting the direct current electrical energy to said printed circuit board in said first LED module and outputting said direct current electrical energy from said first LED module to said at least one second LED module and inputting said direct current electrical energy to said printed circuit board in said at least one second LED module and then outputting said direct current electrical energy to another LED module;
　a first type of mating connector for receiving said direct current electrical energy connected to said at least one wire inputting direct current electrical energy to said printed circuit board in said first LED module;
　a second type of mating connector connected to said at least one wire for outputting said direct current electrical energy from said at least one second LED module to another LED module;
　whereby said set of LED modules are interconnected with another LED module by interconnecting said second type of mating connector with a first type of mating connector on said another LED module.

6. The string of interconnectable LED modules as defined in claim 5 wherein said first type of mating connector is a female connector and said second type of mating connector is a male connector.

7. The string of interconnectable LED modules as defined in claim 6 wherein said first type of mating connector and said second type of mating connector snap fit together.

8. The string of interconnectable LED modules as defined in claim 5 wherein said first type of mating connector and said second type of mating connector include visible arrows indicating the input of direct current electrical energy through said first type of mating connector and the output of direct current electrical energy through said second type of mating connector.

9. A method of making a string of interconnectable LED modules for interconnection with a direct current electrical energy power supply, each of said interconnectable LED modules including a printed circuit board providing mechanical support and direct current electrical energy to an LED, said method comprising:
　attaching at least one wire to the printed circuit board for inputting the direct current electrical energy to a first LED module and outputting the direct current electrical energy from the LED module to another LED module;
　attaching a first type of mating connector to said at least one wire for inputting the direct current electrical energy to said first interconnectable LED module;
　attaching a second type of connector to said at least one wire for outputting the direct current electrical energy from said first LED module to another interconnectable LED module;
　whereby said string of interconnectable LED modules is created by attaching said second type of mating connector on said first interconnectable LED module to said first type of mating connector on said another interconnectable LED module.

10. The method of making a string of interconnectable LED modules as defined in claim 9 wherein said first type of mating connector is a female connector and said second type of mating connector is a male connector.

11. The method of making a string of interconnectable LED modules as defined in claim 10 wherein said first and second type of mating connectors enable a snap fit connection.

12. The method of making a string of LED modules as defined in claim 9 wherein said first type of mating connector and said second type of mating connector include visible arrows indicating the flow of direct current electrical energy through the first mating connector and the second mating connector.

13. The method of making a string of interconnectable LED modules as defined in claim 9 further including interconnecting said first interconnectable LED module and said another interconnectable LED module using an extension connector, said extension connector including a first type of mating connector on one end of said at least one wire, a second type of mating connector on the other end of said at least one wire, whereby said second type of mating connector extending from said first LED is connected to said first type of mating connector on the end of said extension connector and said second type of mating connector on the end of said extension connector is connected to said first type of mating connector on said another interonnectable LED module.

14. A system for proving illumination using LEDs, said system comprising:
　a direct current electrical energy supply having at least one wire extending therefrom;
　a printed circuit board providing mechanical support and direct current electrical energy to an LED from said direct current electrical energy supply;
　a least one wire for conducting said direct current electrical energy to said printed circuit board and conducting said direct current electrical energy to another printed circuit board providing mechanical support and direct current electrical energy to an LED;
　a first type of mating connector for receiving said direct current electrical energy connected to said at least one wire conducting said direct current electrical energy to said printed circuit board;
　a second type of mating connector connected to said at least one wire for sending said direct current electrical energy to another printed circuit board;
　said second type of mating connector being attached to said at least one wire extending from the direct current electrical energy supply;
　whereby said LEDs are illuminated by connecting said second type of mating connector attached to said direct current electrical energy supply to said first type of mating connector on said printed circuit board and connecting said second type of mating connector on said printed circuit board to said first type of mating connector on said another printed circuit board.

\* \* \* \* \*